Nov. 18, 1969  K. H. THIKÖTTER  3,479,017
APPARATUS FOR CHARGING LIQUIDS WITH GASES
Filed Feb. 10, 1967  2 Sheets-Sheet 1
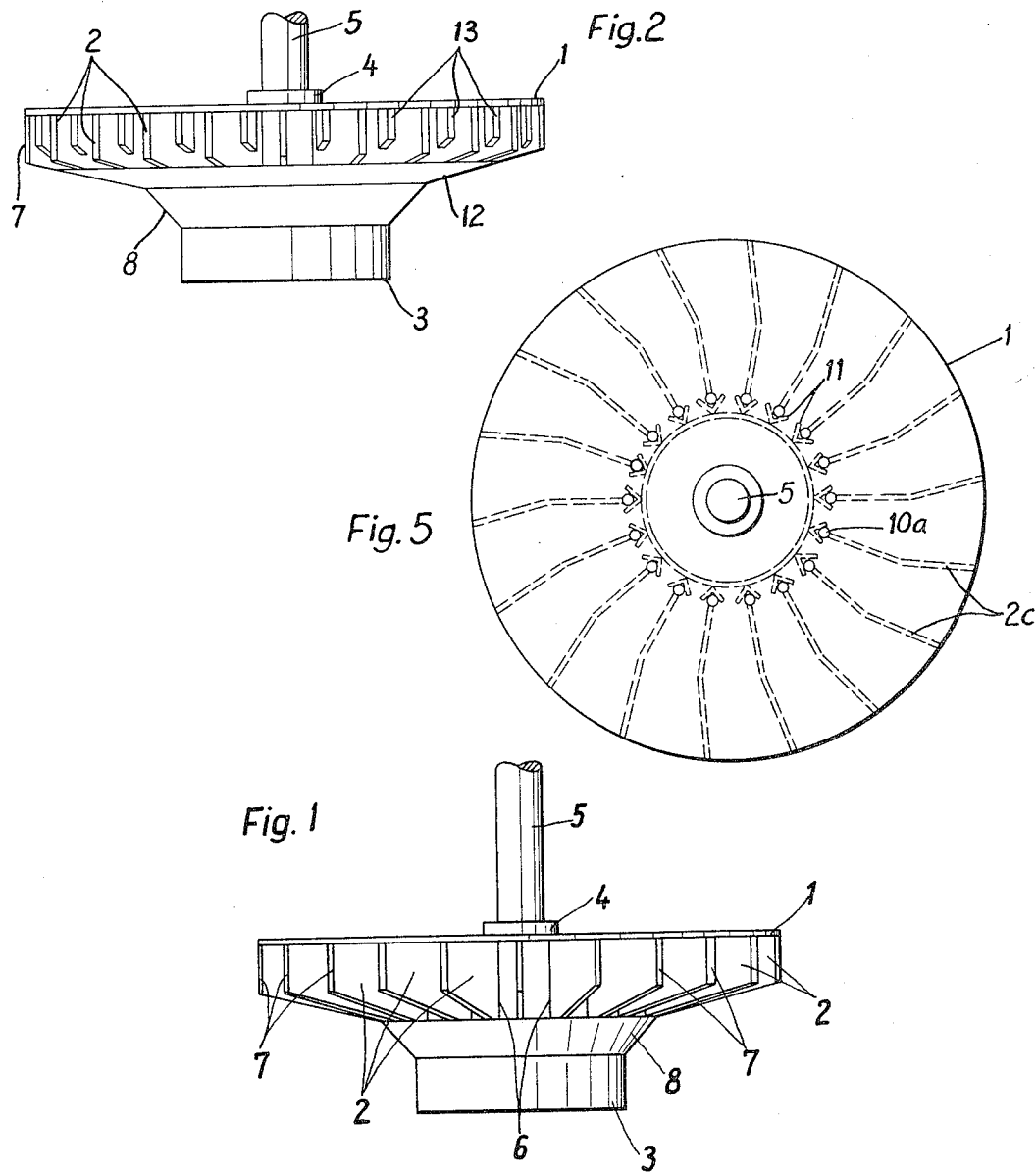
Inventor:
KLAUS HERMANN Thikötter
BY
Bailey, Stephens & Huettig
ATTORNEYS

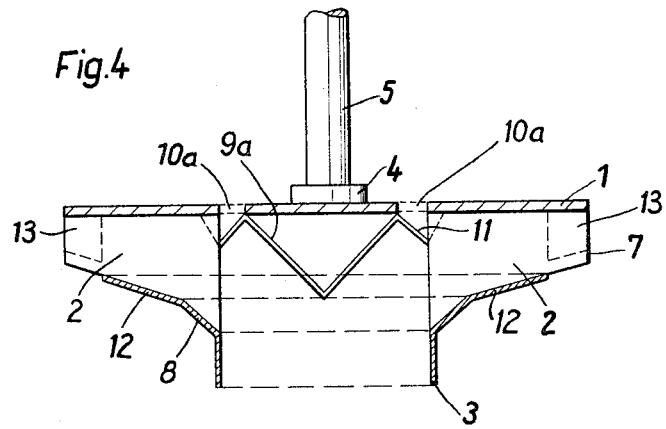
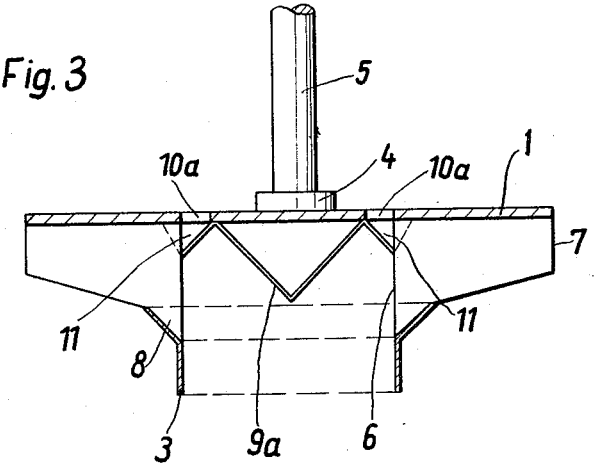

United States Patent Office 3,479,017
Patented Nov. 18, 1969

3,479,017
APPARATUS FOR CHARGING LIQUIDS WITH GASES
Klaus Hermann Thikötter, Frankfurt am Main, Germany, assignor to Metallgesellschaft Aktiengesellschaft, Frankfurt am Main, Germany
Filed Feb. 10, 1967, Ser. No. 615,242
Claims priority, application Germany, Feb. 10, 1966, M 68,348; Sept. 1, 1966, M 70,775
Int. Cl. B01f 7/16
U.S. Cl. 261—91                                    1 Claim

ABSTRACT OF THE DISCLOSURE

An impeller for charging a liquid with gas, particularly for aerating sewage in the activated sludge process, comprises a flat, circular impeller disc which is adapted to be rotated on a vertical axis in a body of liquid to be charged with gas. A plurality of impeller blades are carried by said disc and depend from its undersurface. The blades extend from adjacent to said outer rim inwardly over only part of the radius of the disc. The height of each impeller blade decreases from its leading inner edge to its trailing outer edge so that the cross-sectional area of each flow channel defined by said blades and undersurface is substantially constant throughout the length of the impeller blades. The leading edges of the blades are spaced from the center of the disc to form a liquid intake opening having a cross-sectional area as large as the total cross-sectional area of the flow channels. Gas intake openings are positioned exactly radially inwardly from the leading edges of the blades and shielding means are secure to the disc to prevent liquid from entering the openings.

---

This invention relates to apparatus for charging liquids with gases, particularly for aerating sewage. For charging liquids with gases, impellers are known which are disposed close to the liquid level and rotate about a vertical axis. These impellers spray a stream of liquid over the surface of the liquid and/or suck gas into the liquid to ensure an intense contact between the liquid and the gas. Some of these devices comprise a disc, which is flat or has a conical top and is provided with depending impeller blades on its underside. These impeller blades are of constant height from the inside to the outside and extend from the periphery of the disc to a hub disposed at the apex of a conical disc or inwardly over part of the radius of the disc. Impeller blades of this kind are unfavorable from the hydraulic aspect. As the impeller blades are of constant height, flow passages of radially outwardly increasing cross-sectional area are defined by the disc and the impeller blades. The cross-sectional area of these flow passages increases in the direction of flow of the liquid. In accordance therewith, liquid enters the flow passages defined by the impeller blades and the disc throughout the length of the free lower edge of the impeller blades. This flow condition results in losses which are due to water hammer and which increase with the radius of the point where the liquid enters the flow passages. These losses due to water hammer occur because the inflowing liquid must be suddenly accelerated to the circumferential speed of the impeller at the point of entry. Losses due to water hammer are caused also at the vertical inner edges of such impeller blades, which extend inwardly from the rim of the disc only over a small part of the radius of the disc. The losses due to water hammer increase the energy required for handling the liquid so that the economy of the gas-charging operation is reduced.

It has now been found that the losses due to water hammer occurring at the edges of the impeller blades can be much reduced so that the economy of the gas-charging operation is considerably increased.

The invention relates to an apparatus for charging liquids with gases. This apparatus comprises a circular, flat disc, which is disposed adjacent to the level of the liquid and rotates about a vertical axis, and which is provided on its underside with depending impeller blades, which extend from adjacent to the rim of the disc inwardly over part of the radius thereof. The apparatus according to the invention is characterized in that the height of the impeller blades decreases from the leading edge at the inner end of the impeller blade to the trailing edge at the outer end of the impeller blade in such a manner that the flow passages which are defined by the impeller blades and are at least partly open downwardly have a substantially constant cross-sectional area.

The impeller blades extend suitably toward the center of the disc only to such an extent that a circular liquid intake passage is left at the center of the disc and the cross-sectional area of said liquid intake passage is at least as large as the sum of the cross-sectional areas of the flow passages defined by the impeller blades. Liquid can flow from bottom to top into the impeller through said liquid intake passage.

When the impeller blades are arranged according to the invention in such a manner that the cross-sectional areas of the flow passages defined by the impeller blades and the disc are substantially constant from the liquid intake passage to the discharge opening, no liquid will enter the flow passages at the free open edges of the impeller blades so that no losses due to water hammer occur at these edges.

In an ideal case, the lower edge of the impeller blades is defined by a section of a hyperbola. The flow passage which is defined by the undersurface of the disc and two such blades, which extend radially, has a constant cross-sectional area throughout its length, from the liquid intake passage to the rim of the disc. Such impeller blades which have a lower edge in the form of a hyperbola can be made without difficulty from suitable material, such as sheet iron. The lower edges of the impeller blades need not be formed in accordance with a section of a hyperbola, however, because it is sufficient if the lower edges approximate the ideal curve. For instance, excellent results will be obtained in operation if the lower edges of the impeller blades are formed by two intersecting straight lines which have different inclinations.

The number of impeller blades used in an impeller will depend on the diameter of the disc. With a disc which is, e.g., 1 meter in diameter, 18 to 24 impeller blades may be regularly spaced around the periphery of the disc, although the number of blades may be smaller or larger. Excellent results have been obtained in operation, e.g., with an impeller which is 1 meter in diameter and has 18 impeller blades. With discs which are larger in diameter, 50 or more impeller blades, e.g., may be used.

The impeller blades have a height of about 5 to 30 centimeters at the trailing outer edges.

To improve the deflection of the flow in the impeller from the vertical inflow direction into a generally horizontal direction, an inverted cone may be provided at the center of the disc between the leading edges of the impeller blades.

A cylindrical ring is suitably secured to the lower ends of the leading edges of the impeller blades and this ring has the same diameter as the liquid intake passage of the impeller and approximately the same height as the impeller blades at the outside periphery of the impeller. The ring prevents mechanical or hydraulic vibration in a direction which is transverse to the axis of the impeller.

The impeller blades need not be plane but may be curved or angled. Curved or angled impeller blades may be used to modify the energy transfer and the liquid-handling capacity of the impellers.

If curved or angled impeller blades are secured to the disc in such a manner that the leading inner edges of the impeller blades extend radially toward the center of the disc, the liquid-handling capacity of the impeller and the gas-charging operation can be varied in a simple manner between two stages by a reversal of the direction of rotation of the impeller. It is remarkable that a reversal of the direction of flow does not change the economy of the gas-charging operation or changes it only in a small degree. Impeller blades having leading edge portions which are radially directed toward the center of the disc may be so curved or angled that their angle of pitch with respect to the radius at the rim of the disc is about 10–25°, preferably 15°. A reversal of the direction of rotation of such an impeller may result in an increase in the gas-charging rate by about 20–40%.

If it is not intended to reverse the direction of rotation in the operation of an impeller according to the invention, the curved or angled impeller blades are desirably arranged so that the end portions of the impeller blades have a radial direction at the rim of the disc and the leading inner edge portions are pitched in the direction of the inflowing liquid so that losses due to the water hammer caused by the inflowing liquid are minimized.

If the impeller is immersed only to a small depth, vertical vibration of the liquid in the impeller may arise in adverse cases. To prevent such vertical vibration, an additional ring is provided at the lower edges of the impeller blades and this additional ring joins the top edge of the cylindrical ring and has a conoidal shape conforming to the lower edges of the impeller blades. With small impellers having a disc which is about 1–2 meters in diameter, the width of this ring is about ⅕ to ¹⁄₁₀ of the radial extent of the impeller blades.

In order to reliably avoid a vertical vibration of the water under all operating conditions with large impellers up to about 5 meters and more in diameter, the conoidal ring extends outwardly to a considerable extent in large impellers. It is sufficient if the conoidal ring extends outwardly to conform to the lower edges of the impeller blades in such a length that the outside diameter of the conoidal ring is about 0.3 meter smaller than the diameter of the flat circular disc. In many cases, the conoidal ring need not extend outwardly to such an extent. In general, the difference between the diameter of the disc and the outside diameter of the conoidal ring is between about 0.3 meter and 1 meter. In some cases, particularly with impellers which are relatively small in diameter, this difference may be larger. If the lower edges of the impeller blades do not form a continuous curve but, e.g., intersecting straight lines, two or more adjoining conical rings will be mounted on the lower edges of the impeller blades.

Gas is charged into the liquid mainly in the spray of water which is formed outside the rotating impeller. If the impeller disc is formed with suitable gas intake openings, part of the gas may already be dispersed in the liquid within the impeller. With impellers which are intended to rotate in only one direction, such gas intake openings may be provided in known manner in the disc on the trailing sides of the impeller blades with respect to the direction of rotation. These openings are suitably located in the disc close to the leading edges of the impeller blades, where the highest vacuum is effective owing to the deflection of the flow at the leading edges of the impeller blades. This arrangement results also in a long distance for the contact between the liquid and the gas.

Alternatively, the gas intake openings may be formed in the disc radially inwardly of the leading edges of the impeller blades. This arrangement will be selected particularly if the impeller is to be operated in both directions of rotation. With such arrangement, where the holes are disposed exactly radially inwardly of the leading edges of the impeller blades, the holes must be shielded by suitable means from the liquid which enters the impeller.

Particularly suitable shielding means consist of sheet metal and are shaped so that the gas is dispersed in the liquid before and behind the impeller blades with respect to the direction of rotation. In large impellers, the gas intake openings in the impeller disc serve not only to promote the charging with gas but also for stabilization and to reduce the driving power losses which occur when the impeller is started. In large impellers, in which the impeller blades include an angle with the radius of the disc at the periphery of the latter and which are operated in both directions of rotation, the gas intake and pressure equalizing openings are 2–10 centimeters, preferably 3–6 centimeters, in diameter and disposed exactly radially inwardly of the leading edges of the impeller blades and shielded against an inflow of liquid.

To promote the charging with gas, the disc may be provided with additional gas intake openings which are spaced from the leading edges in the direction toward the periphery of the disc.

Particularly with large impellers it will be desirable in most cases to provide small, vertical auxiliary blades at the outside periphery of the impeller between the impeller blades. The auxiliary blades are smaller in height than the corresponding portions of the impeller blades. The auxiliary blade may extend radially from the periphery of the disc. If the impeller blades include an angle with the radius of the disc at the periphery of the latter, the auxiliary blades may extend at the same angle to the radius toward the central region of the disc. The auxiliary blades have approximately the same length as the downwardly open portions of the passages defined by the impeller blades. An auxiliary blade is usually centered in each flow passage defined by two impeller blades.

The auxiliary blades enable a more uniform ejection of liquid out of the impeller and a more uniform spraying action. The auxiliary blades prevent also a fluctuation of the energy input of the impeller. Such fluctuations may occur where no auxiliary blades are provided.

Compared to the previously known impellers, the impeller according to the invention has a higher gas-charging capacity for a given disc diameter. Owing to the higher gas-charging capacity, an impeller according to the invention may be smaller in diameter and consequently less expensive than, e.g., an impeller having flow passages which are completely closed at the bottom. Besides, the drive means for the smaller impellers according to the invention may be lighter in weight and less expensive for a given power rating because the permissible peripheral velocity of the impeller is not influenced by the design of the impeller so that higher impeller speeds are obtained for smaller diameters. The platforms and pedestals for mounting the impeller and the drive motor may be lighter in weight and less expensive because the gas-charging apparatus according to the invention is lighter in weight. Parts which are curved in accordance with complex three-dimensional curves are not required in the impellers according to the invention. The above advantages combine in substantially reducing the prime cost of a gas-charging apparatus according to the invention.

The action of the impeller according to the invention is due to the fact that the impeller does not only impel the liquid which flows through the passages but transmits a relatively large amount of energy indirectly to the liquid which is disposed under the impeller so that this liquid is also impelled into the gas-charging zone disposed outside the impeller and is thus also charged with gas. At the same time, the velocity of liquid flow in the gas-charging container is increased so that the liquid charged with gas is mixed more rapidly with the contents of the entire basin and all parts of the basin are fairly uniformly charged with gas. If the liquids charged with gases contain suspended solids, the increased velocity of flow will oppose a settling and deposition of the solids onto the bottom of the basin. Whereas the cylindrical stabilizing ring has virtually no influence on the gas-charging capacity, the gas-charging capacity will be reduced to about one fourth of the original capacity when the flow passages are completely closed at the lower edges of the impeller blades. It has been found, however, that the handling of the liquid and the charging with gas are only slightly changed by the conoidal ring if the above-mentioned requirements are fulfilled. This means, above all, that the flow passages at the rim of the rotor are open downwardly for a length of at least 15 centimeters.

Illustrative embodiments of the apparatus according to the invention are diagrammatically shown in the drawings, which are out of scale.

FIG. 1 is a side elevation showing a gas-charging apparatus according to the invention with cylindrical and conoidal stabilizing rings.

FIG. 2 is a side elevation showing a gas-charging apparatus according to the invention with vertical and conical stabilizing rings and with auxiliary blades.

FIG. 3 is a vertical radial sectional view of the apparatus of FIG. 1.

FIG. 4 is a vertical radial sectional view of the apparatus of FIG. 2.

FIG. 5 is a top plan view showing a practical embodiment.

Like parts are designated by like numerals in the drawings. Parts which are different in shape or arrangement but have corresponding functions are designated by like numerals with different suffix letters.

The gas-charging apparatus shown in FIG. 1 comprises essentially a circular disc 1, flat vertical impeller blades 2, which extend radially and are provided on the underside of the disc, and a stabilizing ring 3. The disc 1 is permanently or detachably connected to the driving shaft 5, with a reinforcing disc 4 interposed. The impeller blades 2 have leading inner edges 6 and trailing outer edges 7. It is apparent that the cylindrical stabilizing ring 3 depends vertically from the leading inner edges 6 of the impeller blades 2.

FIG. 1 shows an impeller according to the invention which is additionally provided with a conical stabilizing ring 8, which joins the top rim of the cylindrical ring 5 and conforms to the lower edges of the impeller blades 2.

The ring 3 serves for shielding the drive means from horizontal forces which are due to water hammer and vibration. In somes cases, the ring 3 may have a downwardly open, conical portion. The conical ring 8 serves to suppress a vibration of the water in the impeller.

FIG. 2 shows a larger impeller, which has in addition to the rings 3 and 8 a flat, slightly conical ring 12, which also conforms to the lower edges of the impeller blades and at its inside diameter directly joins the conical ring 8. The outside diameter 12 is about 0.3–1 meter smaller than the diameter of the impeller.

The impeller blades 2 extend from the periphery of the disc inwardly over a part of the radius of the disc. It is apparent from FIGS. 1 and 2 and particularly from the sectional FIGS. 3 and 4 that the lower edges of the impeller blades 2 are defined by two straight lines having different inclinations so as to approximate the ideal hyperbolic curve. If the lower edge of the impeller blades is formed by a continuous curve, in an ideal case by a section of a symmetrical hyperbolo, the rings 8 and 12 in the apparatus shown in FIG. 3 are combined in a single ring, which is correspondingly curved.

FIG. 3 is a radial sectional view of an impeller in which the gas intake openings 10a are disposed exactly radially inwardly of the leading edges 6 and are protected by the shielding devices 11 against a flow of liquid, through said openings. A cone 9a is disposed at the center of the area which is defined by the leading edges of the impeller blades and the base of the cone extends inwardly of the openings 10a and shielding means 11 as clearly shown in FIGURES 3 and 4.

FIGS. 2 and 4 show auxiliary blades 13, which are also vertical and extend radially inwardly. Each auxiliary blade is centered between two impeller blades.

The dimensions of the components of the impeller are so selected relative to each other that the cross-sections of flow are as uniform as possible at all points of the impeller. The diameter of the circle defined by the leading edges of the impeller blades 2 or the diameter of the cylindrical ring 3 is selected so that the area of the circle having this diameter corresponds to the total cross-sectional area of all flow passages defined by the impeller blades 2.

The impeller is immersed into the liquid to such an extent that the disc 1 is about 10–20 centimeters under the level of the liquid in the stationary condition. As soon as rotation is imparted to the impeller, the liquid which overlies the disc flows away so that gas can be sucked through the holes 10 or 10a. To reduce the gas-charging rate, the impeller may be lifted or the level of the liquid may be lowered until only the lower ends of the impeller blades 2 are immersed in the liquid.

Outside the disc 2, the impeller liquid is thrown upwardly beyond the level of the liquid and is converted into a spray. The impeller according to the invention may be as large as 5 meters and more in diameter. The peripheral velocity at the outer rim of the disc is 2–6 meters per second, preferably 3–5 meters per second.

EXAMPLE

For treating sewage with air in accordance with the activated sludge process, an impeller according to the invention is used which has a disc 1 meter in diameter and eighteen angled impeller blades. Before the impeller blades were angled, they had the contour which is shown for the blades in FIGS. 1 to 3. The flat blades were then angled by 15° and secured to the disc 1 as is shown in FIG. 5. The angle of pitch of the impeller blades, measured at the periphery of the disc, with respect to the radius is 15°. The vertical trailing edges 7 of the impeller blades are 100 mm. high at the periphery of the disc. The cylindrical ring 3 is also 100 mm. high and has an inside diameter of 550 mm. A conical ring is not provided.

With a peripheral velocity of 4 meters per second at the rim of the disc, the following results were obtained:

| Depth of immersion, centimeters | 0 | 5 | 10 | 5 |
| --- | --- | --- | --- | --- |
| Direction of rotation | [1] Rearw. | [1] Rearw. | [1] Rearw. | [2] Forw. |
| Oxygen charging rate,[3] kg./hr | 12 | 16 | 18 | 20 |
| Power input,[4] kw | 2.7 | 3.4 | 4.3 | 4.8 |
| Oxygen-charging rate per unit power input,[4] kg./kwh | 4.5 | 4.7 | 4.2 | 4.2 |

[1] Convex side of impeller blades faces in the direction of rotation.
[2] Concave side of impeller blades faces in the direction of rotation.
[3] Under standard conditions, using pure water at 10° C. and at air pressure of 760 mm. mercury.
[4] Power input measured at the driving shaft.

What is claimed is:
1. An apparatus for charging liquid with gas comprising
   a flat circular impeller disc rotatable on a vertical axis on the surface level area in a body of the liquid,
   said disc having an outer rim and an undersurface,
   a plurality of impeller blades secured to and depending from said undersurface and extending radially inwardly from adjacent said rim only partly of the radius of said disc,
   said blades forming with said undersurface flow channels which are downwardly open for at least part of their length,
   each blade having an inner leading edge and an outer trailing edge and having a lower edge composed of intersecting lines defining a hyperbola curve, the height of each blade being decreased from said trailing edge to said leading edge, the cross-sectional area of each flow channel being constant throughout the length of the channel, said leading edges being spaced from the center of said disc to form a liquid intake opening having a cross-sectional area as large as the total cross-sectional area of the sum of the cross-sectional areas of the flow channels, and gas intake openings in said disc positioned exactly radially inwardly of said leading edges, and shielding means secured to said disc for shielding said gas intake openings from liquid drawn into said impeller disc during rotation thereof.

References Cited

UNITED STATES PATENTS

| | | | |
|---|---|---|---|
| 2,104,349 | 1/1938 | MacCamy | 261—93 X |
| 2,259,243 | 10/1941 | Daman | 209—169 X |
| 2,743,914 | 5/1956 | Epprecht | 261—93 X |

FOREIGN PATENTS 862,761  3/1961  Great Britain.

RONALD R. WEAVER, Primary Examiner

U.S. Cl. X.R.

210—219; 259—96, 107